United States Patent
Altshuler

(10) Patent No.: US 9,575,393 B2
(45) Date of Patent: Feb. 21, 2017

(54) POLYNOMIAL TEXTURE MAPPING AND REFLECTANCE TRANSFORMATION IMAGING APPARATUS AND TECHNIQUES

(71) Applicant: Benjamin F. S. Altshuler, Cambridge, MA (US)

(72) Inventor: Benjamin F. S. Altshuler, Cambridge, MA (US)

(*) Notice: Subject to any disclaimer, the term of this patent is extended or adjusted under 35 U.S.C. 154(b) by 0 days.

(21) Appl. No.: 14/520,817

(22) Filed: Oct. 22, 2014

(65) Prior Publication Data

US 2016/0116825 A1    Apr. 28, 2016

(51) Int. Cl.
    *G03B 15/03*     (2006.01)
    *H04N 5/225*     (2006.01)
    *H04N 5/235*     (2006.01)
    *G03B 17/56*     (2006.01)

(52) U.S. Cl.
    CPC ............. *G03B 15/03* (2013.01); *G03B 17/561* (2013.01); *H04N 5/2251* (2013.01); *H04N 5/2354* (2013.01)

(58) Field of Classification Search
    CPC ...... H04N 5/2251; H04N 5/2354; G03B 15/03
    USPC ................................. 348/373, 370; 396/422
    See application file for complete search history.

(56) References Cited

U.S. PATENT DOCUMENTS

| 4,516,795 A | * | 5/1985 | Baugh | E21B 33/038 285/315 |
| 7,623,730 B2 | * | 11/2009 | Ritter | G06T 15/04 345/582 |
| 2005/0089323 A1 | * | 4/2005 | Chapman | G03B 15/03 396/422 |

* cited by examiner

*Primary Examiner* — Nhan T Tran
(74) *Attorney, Agent, or Firm* — Holland & Hart LLP

(57) ABSTRACT

An image enhancement device and related techniques in support of polynomial texture mapping (PTM) (also known as reflectance transformation imaging (RTI)) photography. The device may include a number of pod legs that extend from a camera focal plane to a base location around an object of interest. At least some of the pod legs may include one or more markers that indicate locations at which directional light sources are used to illuminate an object for the purpose of creating PTM images. A user may place a light at a number of successive marker locations, and trigger the capture of images of the object. The successive images, along with the known locations of the markers, may be used to generate PTM images of the object. The device and associated techniques improve the accuracy and reliability of PTM image capture and creation as well as provide pedagogical support for teaching PTM techniques.

20 Claims, 5 Drawing Sheets

POLYNOMIAL TEXTURE MAPPING AND REFLECTANCE TRANSFORMATION IMAGING APPARATUS AND TECHNIQUES

FIELD

The present disclosure relates to an apparatus and techniques for obtaining still and/or video images for use in polynomial texture mapping and reflectance transformation imaging and, more specifically, to an apparatus and techniques enhancing the accurate and efficient placement of one or more light sources in multiple known locations and obtaining associated still and/or video images.

BACKGROUND

Polynomial texture mapping (PTM) also known as reflectance transformation imaging (RTI) is a photographic technique that is used for capturing an object's surface shape and color and enabling computerized selective viewing of the object using highly directional lighting sources positioned at specific angles relative to the object. PTM/RTI also permits the mathematical enhancement of the subject's surface shape and color attributes, to reveal surface information that is not readily observable under direct examination of the physical object with a naked eye or even with viewing aids such as optical filters, relief techniques, and the like. For purposes of this disclosure RTI and PTM are referred to interchangeably.

PTM images may be created from information derived from multiple digital photographs of an object shot from a stationary camera position. In each photograph, light is projected from a different known, or knowable, direction. This process produces a series of images of the same subject with varying highlights and shadows. Lighting information from the images is mathematically synthesized to generate a mathematical model of the surface, enabling a user to re-light the PTM image interactively and examine its surface on a screen.

As mentioned above, in order to obtain the data set for interactive PTM images, a series of photographs of the object may be captured when a light is located at a different location. In order for the images to be useful for PTM imaging, it is necessary to have knowledge of the locations of the light, and in some cases improper light locations may have a negative impact on the processing of the images. Furthermore, in some cases efficiency may be enhanced by having reliably placed lighting for a series of PTM images.

SUMMARY

Aspects of the present disclosure relate to an apparatus and techniques for increasing reliability and efficiency of obtaining photographs for use in PTM. In some examples, a multi-armed apparatus, also referred to as a location assistance device, may include markers on each of a number of arms that extend from a center location to different locations surrounding an object to be imaged. One or more of the arms, also referred to as pod legs, may include markers that may mark locations at which a light, such as a flash unit (or light bulb, LED, etc.), is to be placed for use in generating a photograph for a PTM image.

Such an apparatus may allow efficient and reliable generation of photographs for PTM imaging by personnel that may not necessarily be trained or have extensive experience in obtaining such photographs. Furthermore, such an apparatus may be useful in environments where it may be difficult to estimate relative position of a light, such as in a marine environment in which it may be difficult to estimate (kinesthetically) the relative position of the flash unit to the object being imaged.

In some examples, the location assistance device may have a number of pod legs that each attach to a center camera mounting ring and extend down to a pod base. The camera mounting ring may be affixed to a tripod, or other holding device, and a camera may be secured to the camera mounting ring.

Without limiting the utility, or general applicability of the device and associated techniques, the subject matter of this patent application are particularly useful with regards to the creation of PTM/RTI images of archaeological objects, artworks, palimpsests, and manuscripts undergoing forensic examination. The device and techniques described herein also may be used as a pedagogical teaching device by demonstrating the proper locations for the placement of directional light sources when capturing images for use with PTM.

The foregoing and other features, utilities and advantages will be apparent from the following more particular description of various embodiments as illustrated in the accompanying drawings.

DETAILED DESCRIPTION

The present disclosure provides a polynomial texture mapping (PTM) also known as reflectance transformation imaging (RTI) location assistance device and associated techniques for obtaining images for use in PTM. The location assistance device may include a number of pod legs that extend from a camera focal point to a base location around an object of interest. At least some of the pod legs may include one or more markers that indicate a location at which a light is to be located for generation of a photograph to be used for generating a PTM image. A user may place a light at a number of successive marker locations, and trigger the capture of an image of the object of interest. The successive images, along with the known locations of the markers, may be used to generate PTM images for the object of interest. The pod legs may be collapsible or telescoping to provide a portable mechanism for reliable and efficient generating of photographs that are to be used in PTM. Without limiting the utility, or general applicability, of the device and associated techniques, the subject matter of this patent application are particularly useful with regards to the creation of PTM/RTI images of archaeological objects, artworks, palimpsests, and manuscripts undergoing forensic examination. The device and techniques described herein also may be used as a pedagogical teaching device by demonstrating the proper locations for the placement of directional light sources when capturing images for use with PTM.

Figure 1:
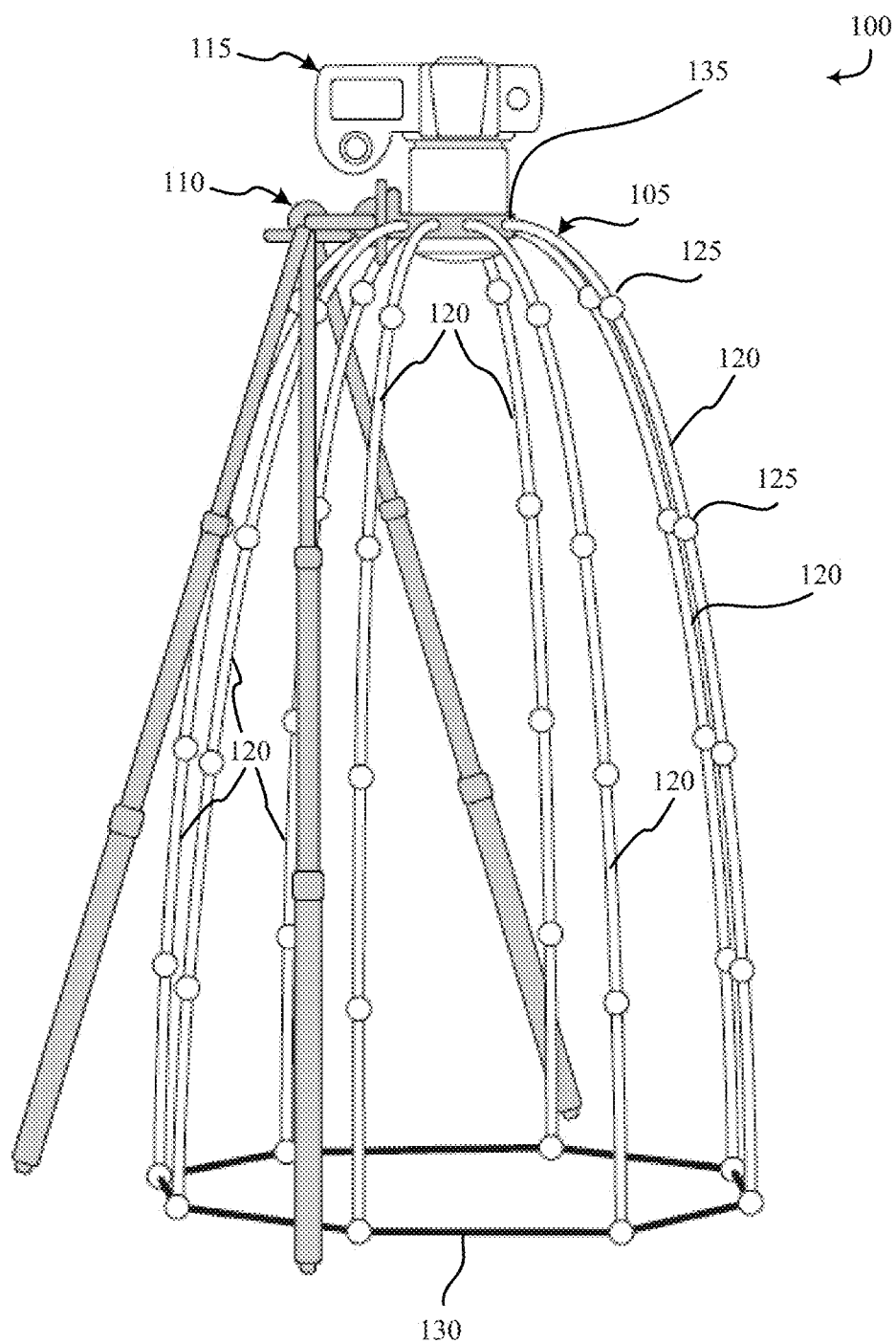
FIG. 1 is a side view of the PTM apparatus according to various aspects of the disclosure.
Figure 2:
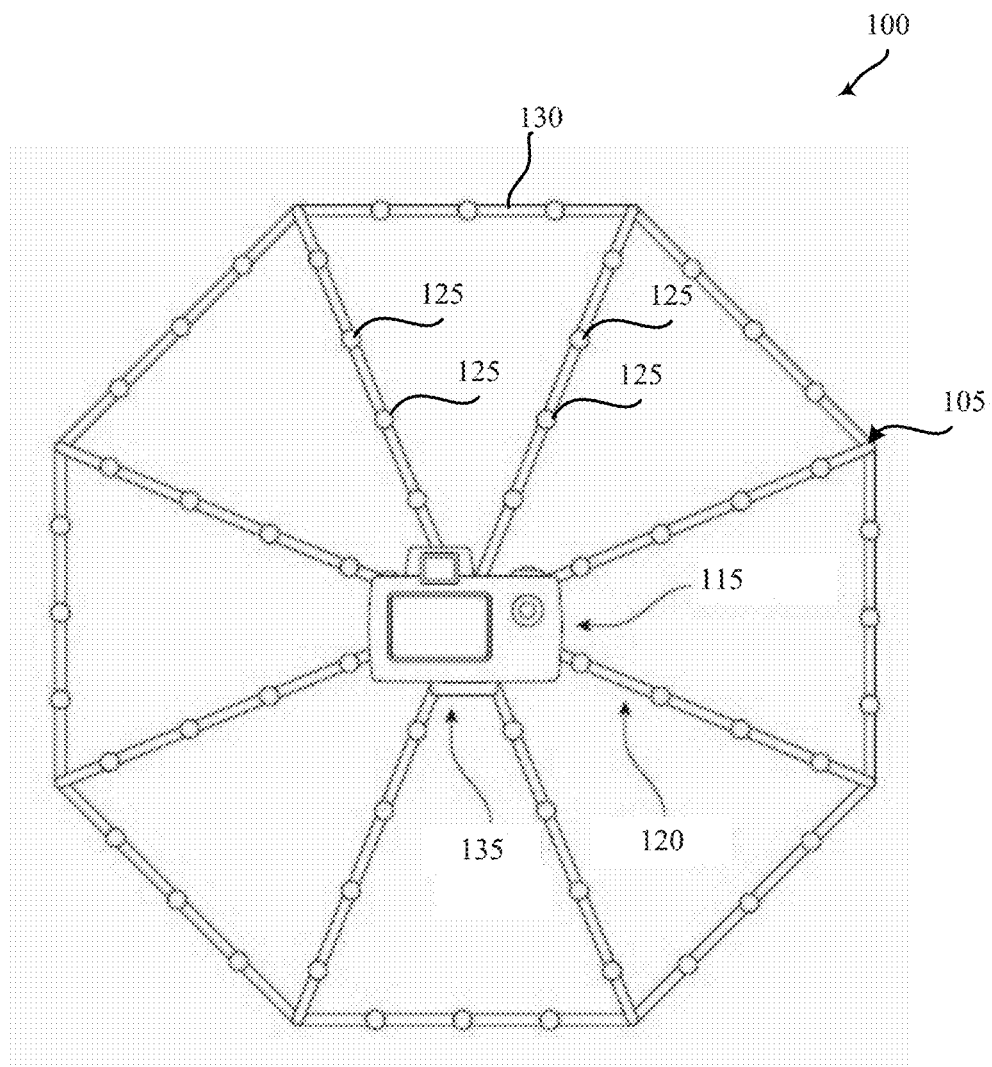
FIG. 2 is a top view of the PTM apparatus according to various aspects of the disclosure.
Figure 4:
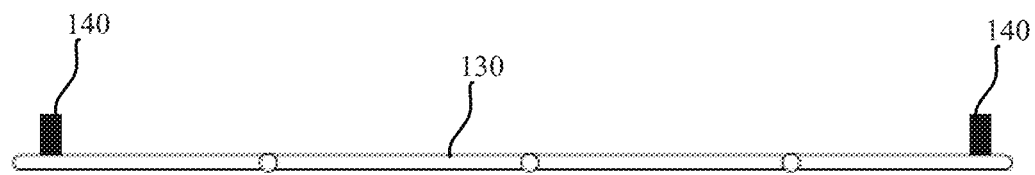
FIG. 4 is a side view of a pod base according to various aspects of the disclosure.

With reference now to the drawings, an exemplary system and configuration is discussed. FIGS. 1-2 illustrate an exemplary PTM apparatus 100 having a location assistance device 105, a tripod 110 or other stand, and an imaging device 115 such as a digital camera. The location assistance device 105 includes a plurality of pod legs 120 that each include one or more markers 125. Each of the pod legs 120 may extend from a central top location such as mounting ring 135 to a lower base location such as pod base connector 130. The pod base connector 130 may include Velcro strips, such as strips 140 illustrated in FIG. 4, that may secure the pod legs 120 to desired locations about an object of interest. The pod base connector 130 may, in some examples, include a number of segmented legs that connect the extended pod legs 120 to one another to create a stable base of the apparatus.

Figure 3:
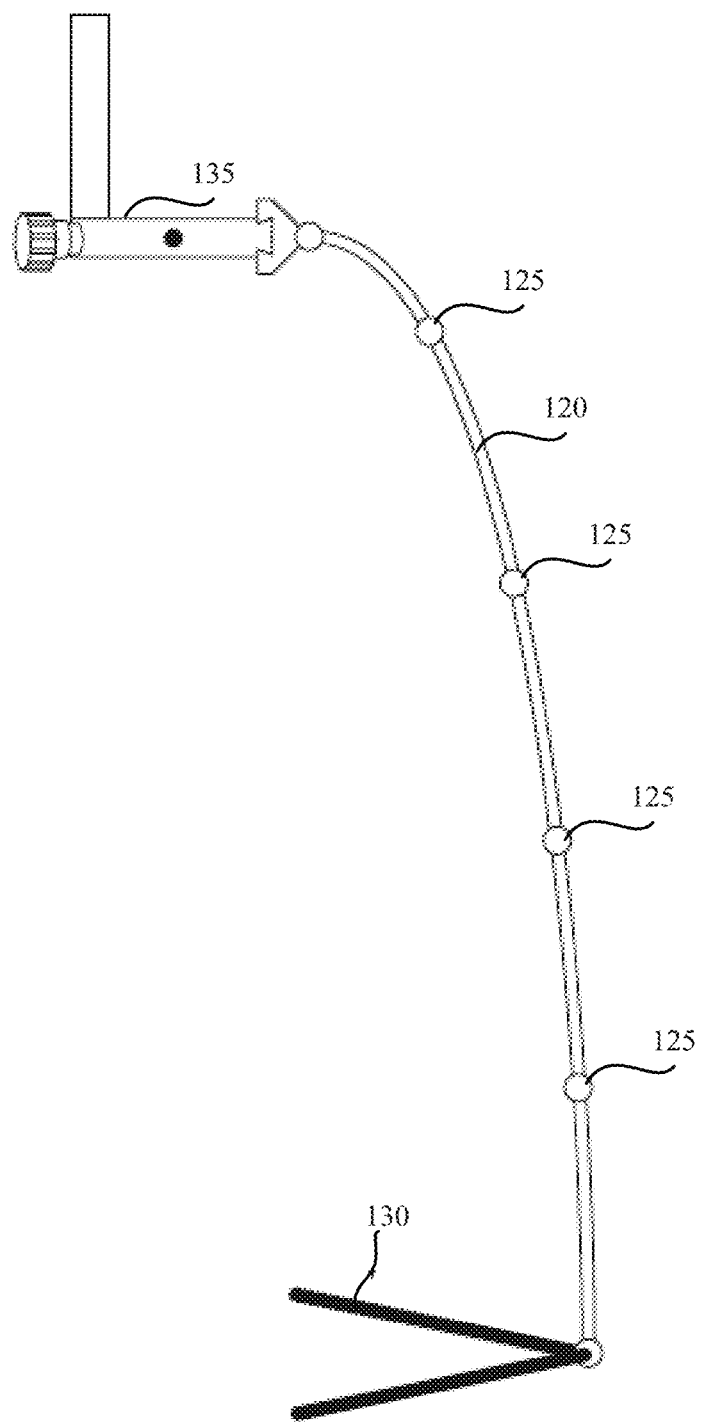
FIG. 3 is a side view of a pod leg and camera mounting ring according to various aspects of the disclosure.

The markers 125 of each pod leg 120 may be seen more clearly in the illustration of FIG. 3. In some examples, some or all of the markers 125 located on one or more of the pod legs 120 may denote a location at which a light is to be placed when the imaging device 115 is capturing an image of an object of interest. In some examples, the location assistance device may be placed about an object of interest such as an artifact. A user may desire to perform PTM on the object of interest in order to analyze various surface features of the object.

A light, such as a flash unit, may be tethered to the imaging device, and the user may place the light unit at a marker and depress a button to trigger the imaging device to capture an image of the object of interest. The user may move the light unit to successive markers and trigger the imaging device 115 to capture successive images of the object of interest when the light unit illuminated the object at different angles. In some examples, each pod leg 120 may be numbered (e.g., 1 through 8), and each marker 125 may be lettered (e.g., A through F), and the successive images may be noted by the number and letter designations of the locations of the light unit at the successive images. Such information may be used for PTM. In such a manner, reliable and efficient images for PTM may be acquired with little training and setup time. Furthermore, such a device may be used in situations where it may be difficult to estimate locations. For example, in low light or underwater locations, locations may be difficult to estimate, and the location assistance device may allow for reliable location of a light unit for different images. In some applications, the device 115 may be used for the creation of PTM/RTI images of archaeological objects, artworks, palimpsests, and manuscripts undergoing forensic examination. The device 115 also may be used as a pedagogical teaching device by demonstrating the proper locations for the placement of directional light sources when capturing images for use with PTM.

Figure 5:
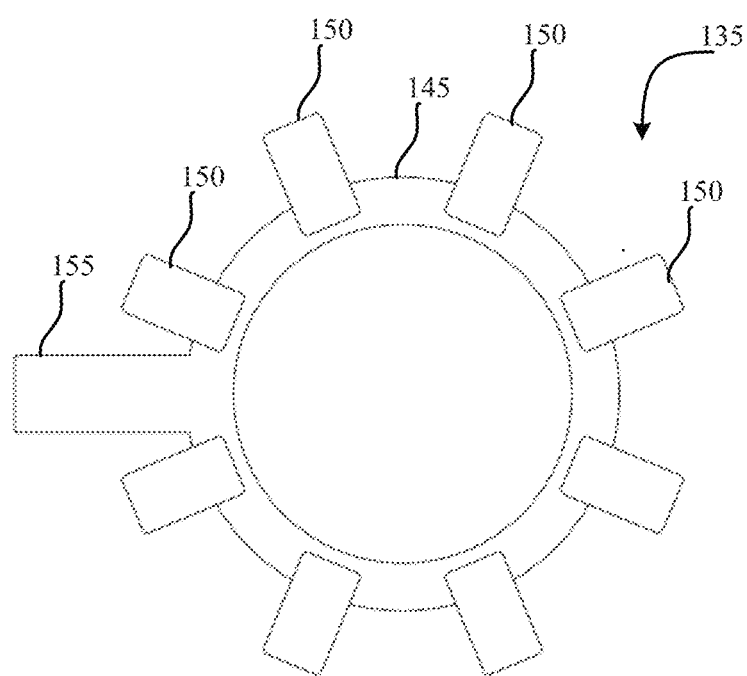
FIG. 5 is a detail view of a camera mounting ring according to various aspects of the disclosure.
Figure 6:
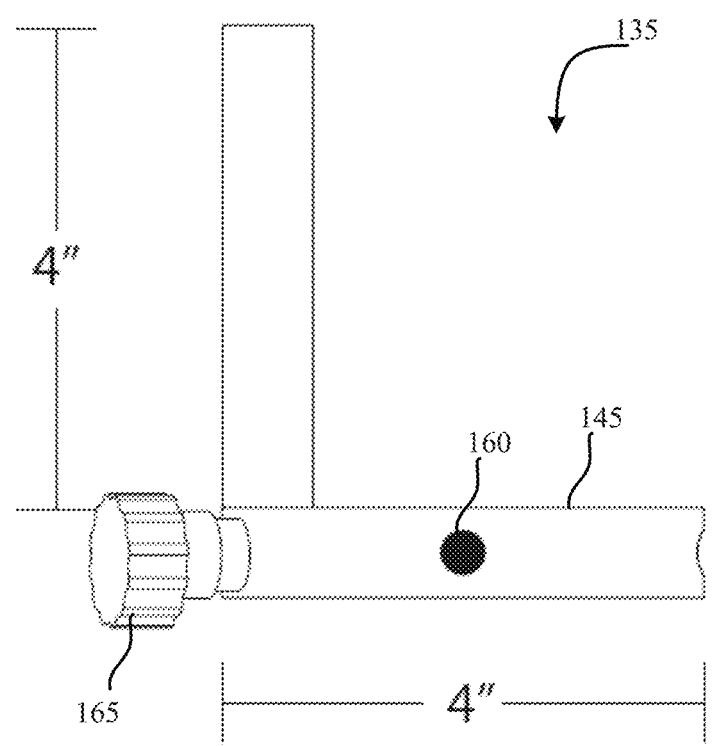
FIG. 6 is another detail view of a camera mounting ring according to various aspects of the disclosure.

FIGS. 5 and 6 illustrate detail views of a mounting ring of various examples. In these figures, the mounting ring 135 may include a center ring 145, a number of connection points 150 that may connect to each pod leg 120, and a tripod mount 155 that may mount the device to a tripod or other stand, such that the location of each marker relative to a focal point of the imaging device 115 is a known quantity. A camera mounting ring tensioner 165 may cause the mounting ring to tighten or loosen, locking a camera lens into a fixed position relative to apparatus. In some examples, threaded holes 160 may be sued to secure pod legs 120 to the mounting ring 135.

As mentioned above, each pod leg 120 may include a plurality of segments, which may be connected by an adjustable pod ball joint, in some examples. Ball joints may include locking tori that allow the pod legs to adjust the height of the location assistance device between a minimum and a maximum height.

The previous description is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

I claim:

1. A polynomial texture mapping (PTM) also known as reflectance transformation imaging (RTI) apparatus, comprising:
   a plurality of pod legs extending from a central top location to a base location, the central top location configured to be coupled with an imaging device;
   a single, movable light source coupled with the imaging device; and
   one or more markers located on one or more of the pod legs, the one or more markers denoting a location at which the movable light source is to be placed when the imaging device is capturing an image of an object of interest.

2. The PTM apparatus of claim 1, further comprising:
   a pod base connector coupled with each of the plurality of pod legs at the base location and that secures the pod legs at identified locations.

3. The PTM apparatus of claim 1, further comprising:
   a mounting ring coupled with each of the plurality of pod legs at the central top location, the mounting ring configured to secure an imaging device at the top location such that the location of each marker relative to a focal point of the imaging device is a known quantity.

4. The PTM apparatus of claim 3, wherein the mounting ring and plurality of pod legs are secured at a location relative to an object of interest by a stand assembly.

5. The PTM apparatus of claim 4, wherein the stand assembly comprises a tripod, and the mounting ring is configured to be secured to the tripod.

6. The PTM apparatus of claim 1, wherein each pod leg comprises a plurality of segments, and wherein one or more markers are identified as a connection point between each segment.

7. The PTM apparatus of claim 6, wherein each pod leg comprises between 1 and 6 segments.

8. The PTM apparatus of claim 6, wherein each pod leg is identified by a first identifier, and each connection point is identified by a second identifier, and wherein a light is placed at successive first and second identifier locations for capture of successive images for use in PTM.

9. The PTM apparatus of claim 6, wherein each connection point comprises an adjustable pod ball joint.

10. The PTM apparatus of claim 9, wherein each ball joint comprises a locking tori that allow the pod legs to expand between a first height and a second increased height.

11. The PTM apparatus of claim 1, wherein the PTM apparatus is configured for use under water to provide reliable estimation of locations relative to a focal point of an imaging device.

12. The PTM apparatus of claim 1, wherein the PTM apparatus is used as a pedagogical teaching device by demonstrating the proper locations for the placement of directional light sources when capturing images for use with PTM.

13. A polynomial texture mapping (PTM), also known as reflectance transformation imaging (RTI), apparatus, comprising:
- a tripod stand assembly having a mounting ring configured to secure an imaging device thereto;
- a location assistance device coupled with the tripod stand assembly that comprises a central top location coupled with the mounting ring and a plurality of pod legs extending from the central top location to a base location;
- a single, movable light source coupled with the imaging device; and
- a plurality of markers located the pod legs, each of the plurality of markers denoting a location at which the movable light source is to be placed when the imaging device is capturing an image of an object of interest.

14. The PTM apparatus of claim 13, wherein the tripod stand assembly does not have any of the plurality of markers located thereon.

15. The PTM apparatus of claim 13, wherein each pod leg is marked with a number and has a plurality of markers located thereon that each have a different letter, and wherein the movable light source is to be placed successively at each lettered marker on each numbered pod leg when the imaging device is capturing successive images of an object of interest.

16. The PTM apparatus of claim 15, wherein the PTM apparatus is configured for use under water to provide reliable estimation of locations relative to a focal point of the imaging device.

17. A polynomial texture mapping (PTM), also known as reflectance transformation imaging (RTI), apparatus comprising:
- a tripod stand assembly having a mounting ring configured to secure an imaging device thereto;
- a location assistance device coupled with the tripod stand assembly that comprises a central top location coupled with the mounting ring and a plurality of pod legs extending from the central top location to a base location, wherein the plurality of pod legs do not have a light source secured thereto;
- a pod base connector coupled with each of the plurality of pod legs that secures the pod legs to desired locations about an object of interest;
- a single, movable light source coupled with the imaging device; and
- a plurality of markers located the pod legs, each of the plurality of markers denoting a location at which the movable light source is to be placed when the imaging device is capturing an image of the object of interest.

18. The PTM apparatus of claim 17, wherein the tripod stand assembly does not have any of the plurality of markers located thereon.

19. The PTM apparatus of claim 17, wherein each pod leg is marked with a number and has a plurality of markers located thereon that each have a different letter, and wherein the movable light source is to be placed successively at each lettered marker on each numbered pod leg when the imaging device is capturing successive images of an object of interest.

20. The PTM apparatus of claim 19, wherein the PTM apparatus is configured for use under water to provide reliable estimation of locations relative to a focal point of the imaging device.

\* \* \* \* \*